United States Patent
Zhou

(10) Patent No.: US 9,434,016 B2
(45) Date of Patent: Sep. 6, 2016

(54) SAW BLADE CLAMPING DEVICE AND THE OPERATION METHOD THEREOF

(71) Applicant: Chervon (HK) Limited, Wanchai OT (HK)

(72) Inventor: Hongtao Zhou, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 14/656,180

(22) Filed: Mar. 12, 2015

(65) Prior Publication Data

US 2015/0183036 A1 Jul. 2, 2015

Related U.S. Application Data

(62) Division of application No. 13/572,836, filed on Aug. 13, 2012, now abandoned.

(30) Foreign Application Priority Data

Oct. 18, 2011 (CN) ........................ 2011 1 0316298
Oct. 18, 2011 (CN) ........................ 2011 1 0316300

(51) Int. Cl.
   *B23D 49/00* (2006.01)
   *B23D 51/10* (2006.01)

(52) U.S. Cl.
   CPC ............ *B23D 49/006* (2013.01); *B23D 51/10* (2013.01); *Y10T 83/9319* (2015.04)

(58) Field of Classification Search
   CPC .. B23D 49/006; B23D 51/10; Y10T 83/9319
   USPC ................................................ 30/144, 1, 142
   See application file for complete search history.

(56) References Cited

U.S. PATENT DOCUMENTS

| | | | |
|---|---|---|---|
| 6,341,425 B1 * | 1/2002 | Kahle | B26B 7/005 206/372 |
| 6,810,589 B2 * | 11/2004 | Lagaly | B23D 49/162 24/50 |
| 2009/0038164 A1 * | 2/2009 | Vitantonio | B26B 7/005 30/277.4 |
| 2014/0047720 A1 * | 2/2014 | Vitantonio | B23D 49/006 30/369 |
| 2014/0190023 A1 * | 7/2014 | Vitantonio | B23D 51/16 30/369 |

* cited by examiner

*Primary Examiner* — Sean Michalski
(74) *Attorney, Agent, or Firm* — Greenberg Traurig, LLP

(57) ABSTRACT

A saw blade clamping device has a first clamping device for clamping a first working element and a second clamping device for clamping a second clamping element, wherein the first clamping device and the second clamping device are parallel to each other and mounted to a transmission controlling mechanism. The two clamping devices can be controlled by the transmission control mechanism to can not only clamp a single saw blade but to allow for replacement of the single saw blade by double saw blades without changing the clamping system, which enables the replacement of the saw blade to be more convenient and quick.

2 Claims, 7 Drawing Sheets

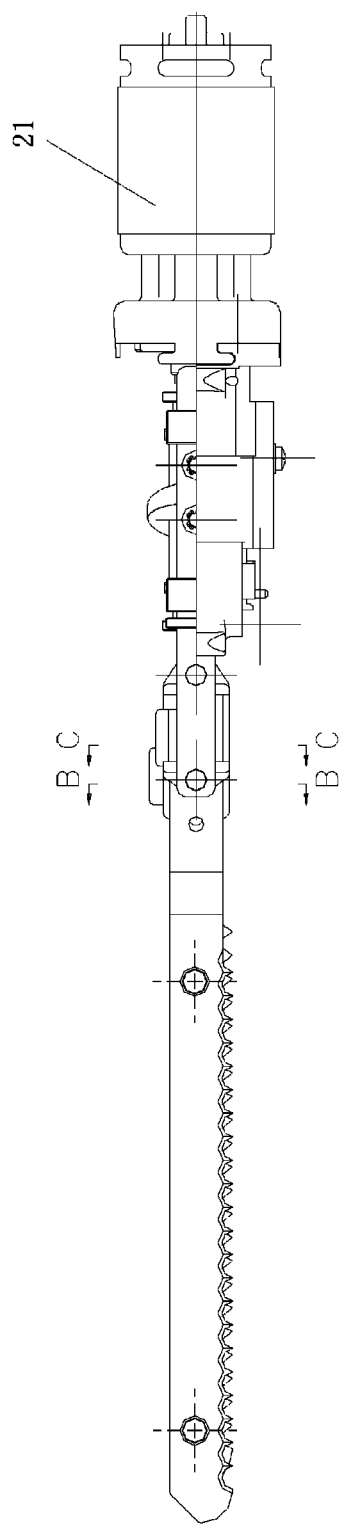
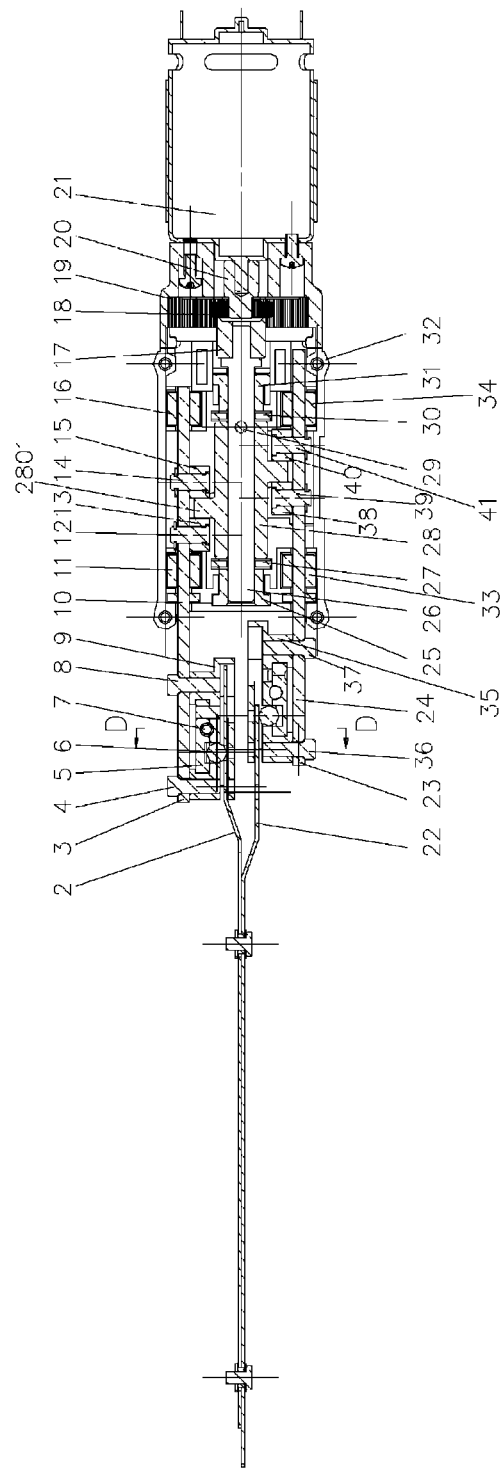
Fig. 1
Fig. 2

SAW BLADE CLAMPING DEVICE AND THE OPERATION METHOD THEREOF

CROSS REFERENCE TO RELATED APPLICATION

This application is a divisional of U.S. patent application Ser. No. 13/572,836, filed Aug. 13, 2012, which is claims the benefit of CN 201110316300.7, filed on Oct. 18, 2011, and CN 201110316298.3, filed on Oct. 18, 2011, the disclosures of which are incorporated herein by reference in their entirety.

BACKGROUND

This disclosure relates to a saw blade clamping device and the operation method thereof, which pertains to the technical field of electric tools.

In a conventional electric cutting tool, a saw blade is mounted to the tool by a clamping device, and controlled and driven to move by a transmission device for a cutting operation. According to various work pieces to be cut, some electric cutting tools adopt a single saw blade to cut relative hard materials, such as wood, steel tube, and copper tube, while some electric cutting tools adopt double saw blades to cut relatively soft materials, such as sponge, foam, temperature preserving glass and fiber material. The prior mechanisms for clamping double saw blades can only clamp double saw blades, and if it is required to clamp a single saw blade, the clamping portion must be replaced, hence, the prior mechanism is not convenient for use.

SUMMARY

The following discloses a saw blade clamping device, which can not only clamp a single saw blade, but also can replace the single saw blade with double saw blades to cut soft materials without replacing the clamping device, thereby improving the using state of the tool and the convenience and speediness of replacing the saw blade.

More particularly, the following describes a saw blade clamping device comprising a first clamping device and a second clamping device, the first clamping device and the second clamping device being parallel to each other and mounted to a transmission control mechanism for converting a rotational motion of a motor to a reciprocating motion of the saw blade clamping device, wherein either of the first clamping device and the second clamping device is used to clamp a first working element, and the first clamping device and the second clamping device are jointly used to clamp a second working element different from the first working element.

The first working element may have an engagement portion for engaging with either of the first clamping device and the second clamping device, and the second working element may have two engagement portions for engaging with the first clamping device and the second clamping device respectively.

The first working element may have a handle portion which may be chosen from the following combination: the handle portion is L-shaped and has a projection along a longitudinal axis of a housing in the direction toward the motor; the handle portion is U-shaped and has a groove along the longitudinal axis in the direction away from the motor; and the handle portion is T-shaped and has a first edge and a second edge, and the handle portion being provided with a convex portion respectively on the first edge and the second edge in a direction vertical to the longitudinal axis of the housing.

The transmission control mechanism may comprise a sun gear mounted to an output shaft of the motor and engaged with a planet gear, the planet gear engaged with an inner gear ring and a planet carrier, a rotating shaft connected to the planet carrier, a cam shaft mounted to the outer circumference of the rotating shaft and connected to the rotating shaft by an arresting pin, and a first sliding rod and a second sliding rod mounted to two cam portions of the cam shaft respectively, the first clamping device and the second clamping device mounted to the first sliding rod member and the second sliding rod member respectively.

The rotating shaft may be mounted into a gearbox by a first oil-retaining bearing and a second oil-retaining bearing.

A sliding rod may be mounted into a gearbox by a first sliding bearing and a second sliding bearing, and the first sliding rod may be mounted into the gearbox by a third sliding bearing and a fourth sliding bearing.

A first roller may be connected to the second sliding rod by a roller pin a and a second roller may be connected to the second sliding rod by a second roller pin, the first and second rollers being clamped to the cam portion as a pair and a third roller may be connected to a first sliding rod by a third roller pin and a fourth roller may be connected to the first sliding rod by a fourth roller pin, the third and fourth rollers being clamped to the cam portion as a pair.

The clamping device may comprises a clamping device body having a long groove for accommodating a saw blade therein, a locating hole arranged in the portion of the saw blade extending into the long groove, a cylindrical groove for accommodating a steel ball arranged in a direction vertical to the locating hole, and a pressing plate mounted into the clamping device body, the pressing plate comprising a concave portion accommodating the steel ball and having a slanting surface as its lower end.

The pressing plate may be connected to a releasing button.

The pressing plate may be provided with a pressing spring at the bottom thereof.

An operation method of a saw blade clamping device may include the steps of pressing a releasing button and inserting a first working element into either of a first clamping device or a second clamping device, releasing the releasing button, engaging the engagement portion of the first working element with the first clamping device or the second clamping device, starting a motor so that the rotational motion of the motor is converted into the reciprocating motion of the first working element by a transmission control mechanism, stopping the motor, pressing down the releasing button, removing the first working element and inserting a second working element different from the first working element into the first clamping device and the second clamping device, releasing the releasing button, so that the two engagement portions of the second element are respectively engaged with the first clamping device and the second clamping device, and starting the motor so that the rotational motion of the motor is converted into the reciprocating motion of the second working element by the transmission control mechanism.

As will become apparent, the disclosed embodiments can control two clamping devices by a transmission control mechanism, that is to say, the present invention can not only clamp a first working element, e.g., a single saw blade, but also can replace it by a second working element, e.g., double saw blades, without replacing the clamping system, which enables the replacement of the saw blade more conveniently and quickly.

BRIEF DESCRIPTION OF THE DRAWINGS

FIG. 2 is a top view of the saw blade clamping device;

FIG. 4 is a sectional view showing the clamping state of the clamping device taken along B-B of FIG. 1;

DETAILED DESCRIPTION

Figure 1:
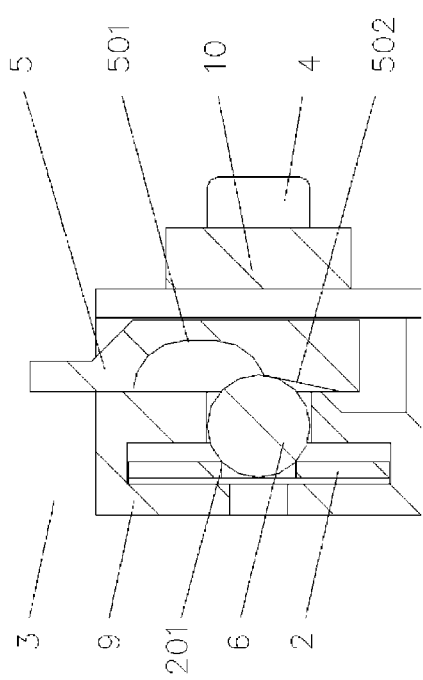
FIG. 1 is a front view of an exemplary saw blade clamping device constructed according to the description that follows.
Figure 5:
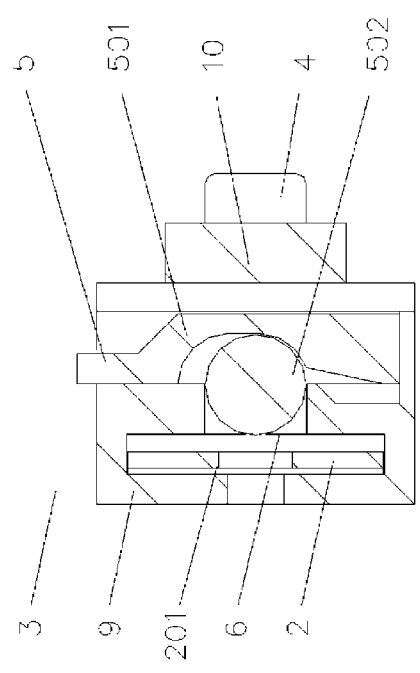
FIG. 5 is a sectional view showing the releasing state of the clamping device taken along B-B of FIG. 1.
Figure 6:
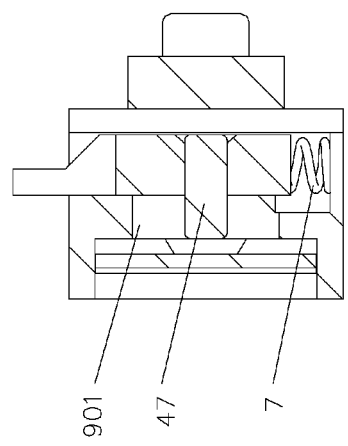
FIG. 6 is a sectional view taken along C-C of FIG. 1.

Turning to FIG. 1, illustrated is a front view of a clamping device according to the description that follows. The clamping device is intended for use in association with a power tool that includes a motor 21 and a transmission control mechanism to which the clamping device is coupled. A working element, namely a saw blade, is mounted to the clamping device.

FIG. 2 is a top view of the saw blade clamping device. A first clamping device and a second clamping device are mounted to the transmission control mechanism in a manner parallel to and offset with respect to each other. The transmission control mechanism includes a sun gear 20 which is mounted to an output shaft of the motor 21 and engaged with a planet gear 18. The planet gear 18 is engaged with an inner gear ring 19 and a planet carrier 17. A rotating shaft 26 is connected to the planet carrier 17. A cam shaft 28 is mounted to the outer circumference of the rotating shaft 26 and connected to the rotating shaft 26 by an arresting pin 29. A second sliding rod component 3 and a first sliding rod component 23 are respectively mounted to two cam portions 2801 of the cam shaft 28. The first clamping device and the second clamping device are respectively mounted to the first sliding rod component 23 and the second sliding rod component 3. When the cam portions 2801 drive the sliding rod components, the cam portions will be subject to an axial force. The cam portions are supported by a first end surface bearing 27 and a second end surface bearing 30 so as to reduce the friction between the end surfaces of the cam portions and oil-retaining bearings.

The rotating shaft 26 is mounted within a gear box 32 by a first oil-retaining bearing 25 and a second oil-retaining bearing 31. A second sliding rod 10 is mounted within the gear box 32 by a first sliding bearing 11 and a second sliding bearing 16. A first sliding rod 24 is mounted within the gear box 32 by a third sliding bearing 33 and a fourth sliding bearing 34.

A first roller 13 is connected to the second sliding rod 10 by a first roller pin 12, and a second roller 15 is connected to the second sliding rod 10 by a second roller pin 14. The first roller 13 and the second roller 15 are clamped to the cam portion 2801 as a pair. A third roller 38 is connected to the first sliding rod 24 by a third roller pin 39, and a fourth roller 40 is connected to the first sliding rod 24 by a fourth roller pin 41. The third roller 38 and the fourth roller 40 are clamped to the cam portion 2801 as a pair.

Figure 3:
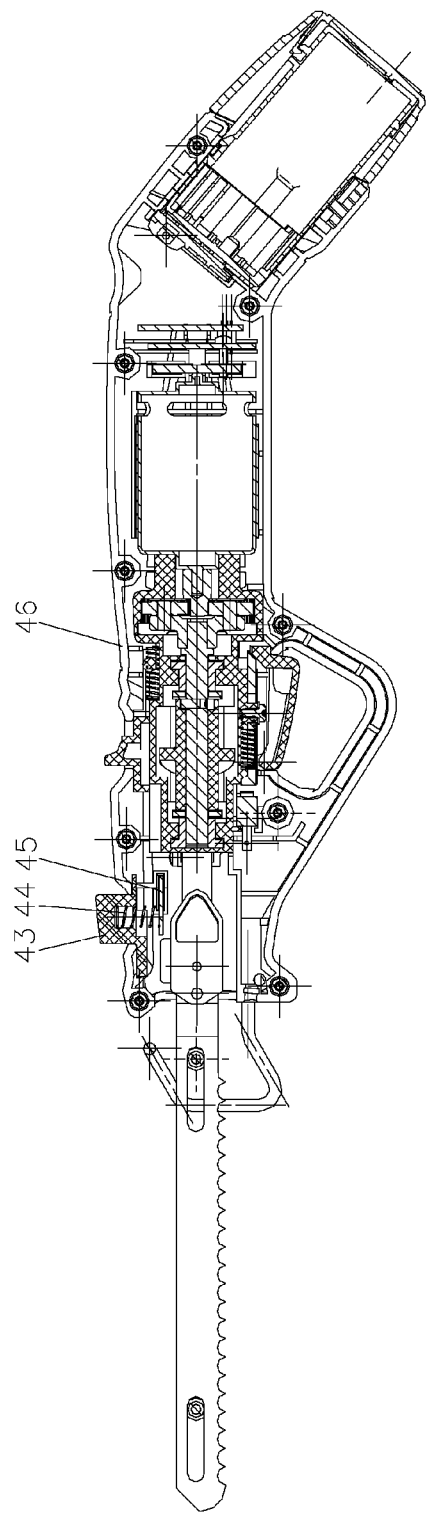
FIG. 3 is a schematic view of an exemplary releasing button.

The second clamping device includes a second clamping device body 9 having a long groove for accommodating a saw blade therein. A locating hole 201 is formed in the portion of the saw blade extending into the long groove as shown in FIG. 4. A cylindrical groove for accommodating a steel ball 6 is formed in a direction vertical to the locating hole 201. A pressing plate 5 is mounted into the second clamping device body 9. The pressing plate 5 comprises a concave portion 501 for accommodating the steel ball 6 and has a slanting surface 502 as the lower end of the concave portion 501. The pressing plate 5 is provided with a pressing spring 7 at the bottom thereof. The pressing plate 5 is connected to a releasing button 43 as shown in FIG. 3, and the releasing button 43 protrudes out of the gear box 32 so as to facilitate the operation.

The process of the energy transmission of the transmission control mechanism is as follows: the motor 21 drives the sun gear 20, the sun gear 20 drives the planet gear 18, the planet gear 18 drives the planet carrier 17, the planet carrier 17 drives the rotating shaft 26, the rotating shaft 26 drives the arresting pin 29, the arresting pin 29 drives the cam shaft 28, the cam portion 2801 of the cam shaft 28 then drives the second sliding rod member 3 and the first sliding rod member 23. As a result, the second sliding rod component 3 drives the second saw blade 2 and the first sliding rod component 23 drives the first saw blade 22.

The configuration of the first clamping device is the same as that of the second clamping device.

FIGS. 3-6 show the clamping operation of the clamping device. The housing 46 supports a arresting plate 45 and the releasing button 43, wherein the arresting plate 45 supports a button spring 44, and the button spring 44 presses the button 43 laterally. The pressing plate 5 supports a fifth pin 47 which may slide in the arresting groove 901 of the second clamping device body 9 so as to limit the pressing plate.

The method for obtaining the releasing state includes pressing the releasing button 43 so that the releasing button 43 presses the pressing plate 5. When the pressing plate is pressed, the concave portion 501 of the pressing plate is opposite the steel ball 6, and the steel ball may slide into the concave portion 501 of the pressing plate. When the steel ball 6 is disengaged from the locating hole 201 of the saw blade the saw blade may be removed from the second clamping device body 9.

The method for obtaining the clamping state from the releasing state includes the second saw blade 2 being inserted. When the locating hole 201 of the second saw blade 2 is opposite the steel ball 6, the releasing button 43 is released. At this time, the releasing button 43 is reset under the lateral pressing force of the button spring 44, and the pressing plate 5 is reset under the lateral pressing force of the pressing spring 7. Thus, the slanting surface 502 of the pressing plate will push the steel ball 6 to press the locating hole 201 laterally and the second saw blade 2 is then clamped and cannot be removed.

Figure 7:
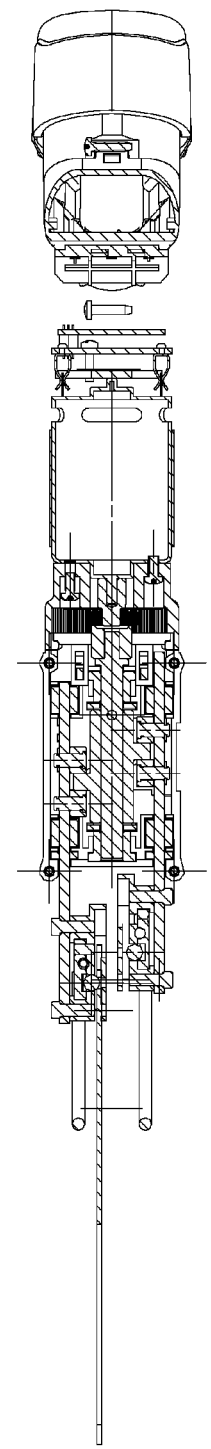
FIG. 7 is a schematic view illustrating the saw blade clamping device clamping the first working element.
Figure 8:
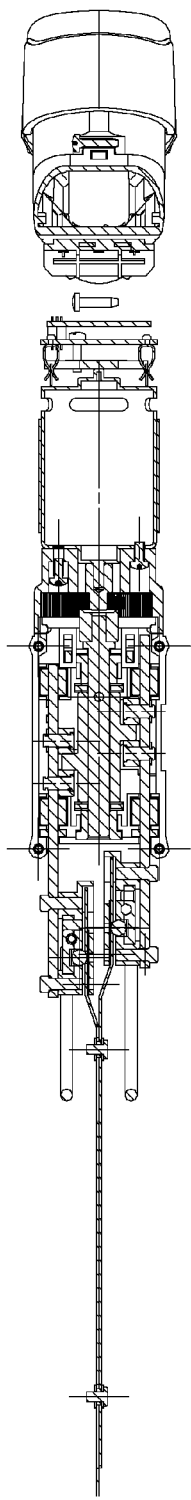
FIG. 8 is a schematic view illustrating the saw blade clamping device clamping the second working element.
Figure 9:
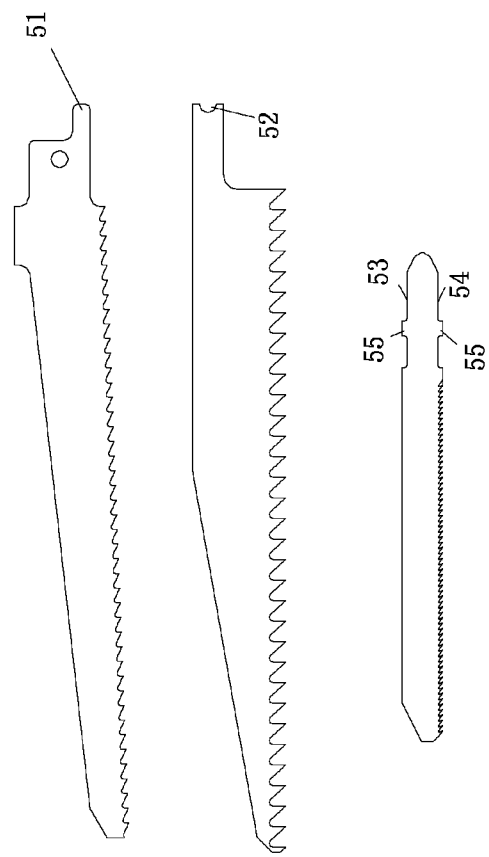
FIG. 9 is a schematic view illustrating the structure of an exemplary handle portion of the working element of the saw blade clamping device.

The clamping mechanism of the present invention not only can clamp a single saw blade to cut hard material, but also can clamp double saw blades to cut soft material. Referring to FIGS. 7-8, FIG. 7 shows that either of the clamping devices may be used to clamp the conventional first working element, i.e., the single saw blade, for example, a saw blade of a reciprocating saw. FIG. 8 shows that the two clamping devices cooperate to clamp the second working element, i.e., double saw blades, thus it enables the two saw blades to move relatively back and forth, thereby performing a cutting operation and cutting soft materials.

The first working element, i.e., the single saw blade may be the second saw blade 2, which includes a handle portion. The handle portion may be selected from the group consisting of an L-shaped handle portion having a projection 51 extending along the longitudinal axis of a housing and towards the motor, an U-shaped handle portion having a groove 52 extending along the longitudinal axis of the housing and away from the motor, and a T-shaped handle portion having a first edge 53 and a second edge 54 each of which has a projection 55 extending along a direction vertical to the longitudinal axis of the housing. The saw blade with a T-shaped handle portion can not be directly clamped by the clamping device mentioned in the above embodiments. It needs a clamping device which can clamp the saw blade with a T-shaped handle portion to clamp the single saw blade with a T-shaped handle portion or double saw blades with a T-shaped handle portion.

It is well known to the person skilled in the art that the first and second working elements may also be a file, a blade, or a grinding tool, which can perform different operations such as cutting, grinding, etc.

Figure 10:
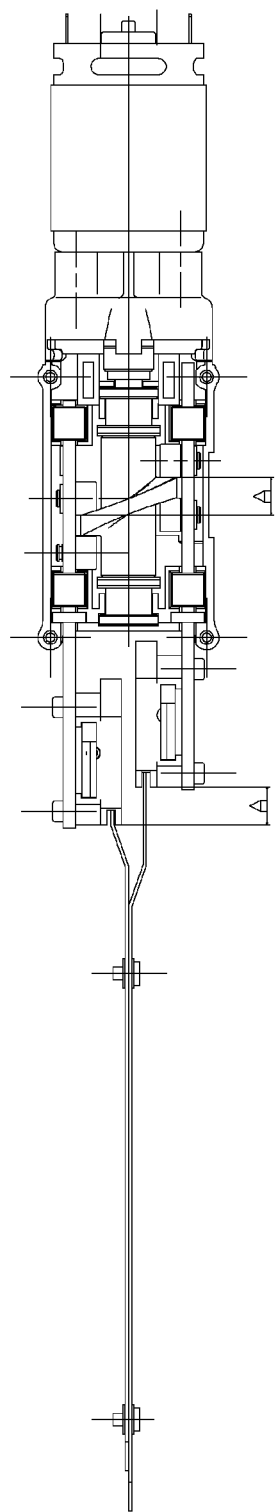
FIG. 10 is a schematic view of the clamping device having a reciprocating stroke A.
Figure 11:
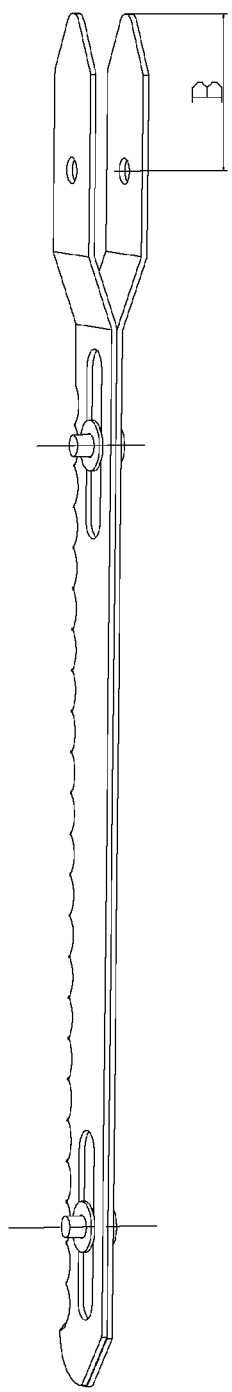
FIG. 11 is a schematic view illustrating that a distance B between the clamping portion and the nail portion of the saw blade.
Figure 12:
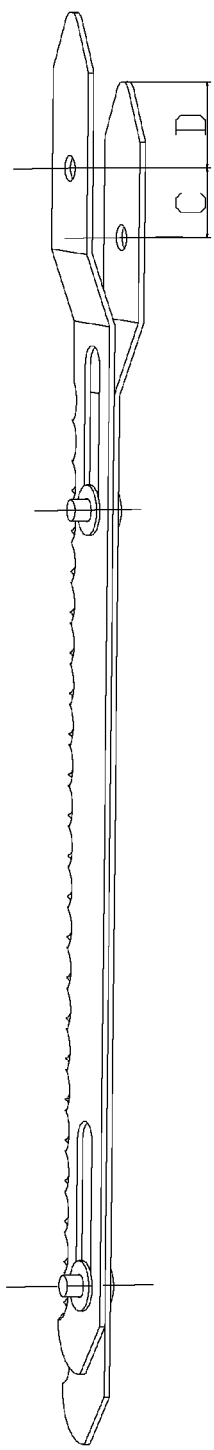
FIG. 12 a schematic view illustrating that a maximal distance C between the two separated saw blades and a distance D between the clamping portion of one slaw blade and the nail portion of another saw blade.

Auto clamping requirements of the clamping device may be explained by referring to FIGS. 10-12. Given that the reciprocating stroke of the clamping device is A, the distance between the clamping portion and the nail portion of the saw blade is B, the maximal distance between the two separated saw blades before assembly is C, then the distance between the clamping portion of one saw blade and the nail portion of the other saw blade is D, in order to enable the double saw blades to be mounted on the clamping device, the device will be started when one saw blade is clamped in position and the other saw blade is not clamped in position, and the other saw blade can be clamped automatically under the action of the reciprocating sliding rod. According to the requirements, it is divided into four circumstances as follows:

When the two clamping devices are completely aligned with each other, that is to say, A=0, the states are as follows:
1. When the two saw blades are assembled after aligned with each other, it needs B≥0;
2. When the two saw blades are assembled after separation, it needs B≥C; generally, C=A+1 mm, thus B≥A;

When the two clamping devices are completely separated, that is to say, A=stroke, the states are as follows:
1. When the two saw blades are assembled after alignment with each other, it needs B≥A;
2. When the two saw blades are assembled after separation, it needs B≥A+C; generally, C=A+1 mm, thus B≥2A.

Therefore, given each states, it is advantageous that B≥2A.

The above-described embodiments are presented by way of example only and are not intended to restrict the present invention. Rather, the claimed invention is intended to have a scope which would encompass equivalent replacements and/or transformations of elements described herein.

What is claimed is:

1. A method of operating a saw blade clamping device, the saw blade clamping device comprising a first clamping device and a second clamping device, the first and second clamping device respectively comprising a groove for accommodating a saw blade, a steel ball arranged adjacent the groove and a pressing blade having a concave portion for accommodating the steel ball, the saw blade comprising a hole for engaging with the steel ball, the method comprising:

pressing a releasing button and inserting a first working element into either of the first clamping device or the second clamping device, wherein the first working element comprises a single blade;

releasing the releasing button so that an engagement portion of the first working element is engaged with the first clamping device or the second clamping device;

starting a motor to enable a transmission controlling mechanism to convert a rotational motion of the motor into a reciprocating motion of the first working element so as to realize a first cutting operation with the single saw blade;

stopping the motor, pressing down the releasing button, removing the first working element and inserting a second working element different from the first working element into the first clamping device and the second clamping device, wherein the second working element comprises double saw blades;

releasing the releasing button so that two engagement portions of the double saw blades are engaged with the first clamping device and the second clamping device respectively; and starting the motor to enable the transmission controlling mechanism to convert the rotational motion of the motor into the reciprocating motion of the second working element so as to realize a second cutting operation with the double saw blades.

2. A method of operating a saw blade as recited in claim 1, wherein a selected one of the first working element and the second working element comprises a clamping portion and a distal operating portion, and a relationship between a distance between the clamping portion and the distal operation portion of the selected working element (B) and the reciprocating stroke of the operable clamping device (A) caused by the transmission controlling mechanism is defined by the equation B>=2A.

* * * * *